United States Patent [19]

Akiyama et al.

[11] Patent Number: 4,563,335
[45] Date of Patent: Jan. 7, 1986

[54] APPARATUS FOR CONTINUOUSLY CONCENTRATING AND DENITRATING NITRATE SOLUTION BY MICROWAVE

[75] Inventors: Hideo Akiyama, Katsuta; Akio Todokoro, Ibaraki; Osamu Takanobu, Katsuta, all of Japan

[73] Assignee: Doryokuro Kakunenryo Kaihatsu Jigyodan, Tokyo, Japan

[21] Appl. No.: 563,613

[22] Filed: Dec. 20, 1983

[30] Foreign Application Priority Data

Dec. 21, 1982 [JP] Japan ............................... 57-224560

[51] Int. Cl.$^4$ ................................................ B01J 1/10
[52] U.S. Cl. .................................... 422/159; 422/186;
422/189; 422/209; 422/903; 159/29; 159/DIG. 12
[58] Field of Search ............... 422/159, 186, 189, 191, 422/193, 209, 903; 55/429, 430, 432; 159/34, 28, 29, DIG. 12

[56] References Cited

U.S. PATENT DOCUMENTS

| | | | |
|---|---|---|---|
| 640,135 | 12/1899 | Hoskins | 159/34 |
| 3,494,722 | 2/1970 | Gray | 422/21 |
| 3,676,038 | 7/1972 | Gray | 422/22 |
| 4,156,600 | 5/1974 | Jacobson | 55/430 |
| 4,364,859 | 12/1982 | Ohtsuka et al. | |
| 4,439,402 | 3/1984 | Tarutani et al. | 422/189 |
| 4,444,723 | 4/1984 | Matsumaru et al. | 422/159 |

Primary Examiner—John Adee
Attorney, Agent, or Firm—Fleit, Jacobson, Cohn & Price

[57] ABSTRACT

An apparatus for continuously concentrating and denitrating a radioactive nitrate solution by microwave includes a rotatably supported concentrating and denitrating vessel disposed within an oven into which microwave is applied through waveguides. The concentrating and denitrating vessel comprises a circular vessel body supported rotatably about its center and a plurality of partition plates positioned radially inside the vessel body so as to divide the interior of the vessel body into a plurality of compartments. The nitrate solution supplied into the vessel is heated, evaporated, concentrated and denitrated in sequence in each of the compartments during one rotation of the vessel to form a denitrated oxide powder. The denitrated powder produced in one of the compartments is transferred into a receiving pan positioned adjacent to the outer periphery of the vessel.

6 Claims, 4 Drawing Figures

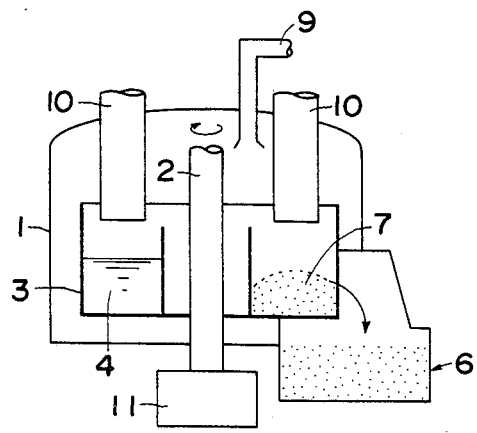
FIG. 1
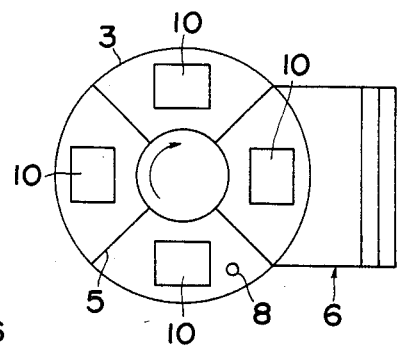
FIG. 2
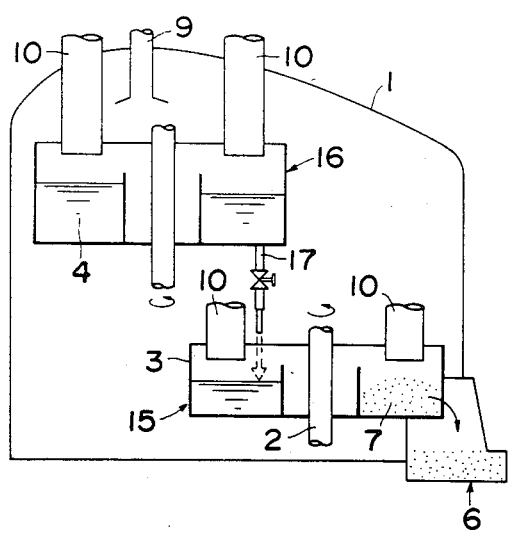
FIG. 3
FIG. 4

APPARATUS FOR CONTINUOUSLY CONCENTRATING AND DENITRATING NITRATE SOLUTION BY MICROWAVE

BACKGROUND OF THE INVENTION

This invention relates to a continuous concentrating and denitrating apparatus using microwave heating, which is capable of the continuous treatment of the concentration by evaporation and denitration of a nitrate solution of plutonium, uranium, a mixture thereof or the like.

Heat treatment system using microwave heating has been proposed for the evaporation and direct denitration of a nitrate solutin of plutonium, uranium or a mixture thereof. (see, for example, U.S. Pat. No. 4,364,859). Denitration by microwave heating enables the production of a good oxide powder of small, spherical particle sizes, so that this technique has come to be used lately instead of a conventional fluidized bed method in processes for producing oxide powders for nuclear fuel pellets from nitrate solutions obtained by the reprocessing of spent nuclear fuel.

However, the method using microwave heating employs a batch-type treatment system in which a heating vessel is installed in an oven to which microwave is applied, and the nitrate solution to be treated is poured into the heating vessel, is evaporated by microwave heating, and is then denitrated. The term "denitration" means that the nitrate solution is thermally decomposed at final stage and the nitric acid is driven away. Therefore, it is necessary with such method to stop the application of microwave, remove the produced denitrated powder, and feed the next batch of nitrate solution to be treated into the heating vessel upon the completion of each run, so that the operation is troublesome and poor in efficiency. Also, since the nitrate solution being treated includes nuclear fuel materials which could reach a critical state, such as plutonium, appropriate control of criticality for safety is required during the treatment, and thus there are placed restrictions on the quantity of nitrate solution that can be fed to the heating vessel during one run. Therefore, such batch-type method is difficult to provide bulk treatment.

When the nitrate solution must be treated, not on a laboratory scale, but in great quantities, a two-stage process has been employed in which the nitrate solution being treated is first concentrated to a fairly high degree in an evaporation concentrator, and then the concentrated solution is transferred to a microwave denitration device and is denitrated therein to form the corresponding denitrated oxide powder. Steam is usually used as the heat source in the evaporation concentrator of a shell-and-tube type, the nitrate solution being treated is passed through the tube side in the concentrator while steam is passed through the shell side, so that heat is exchanged between them to rise the temperature of the solution. This system has the likelihood of fire hazard as oil mixed into the solution could ignite if the steam temperature rises to increase the solution temperature to an abnormal level. In order to prevent such a hazard, a device controlling the steam temperature must be provided to keep the temperature of the solution-heating tube wall below a predetermined level.

Thus the prior art technique described above has many problems. Considering, for example, the evaporation concentrator alone, since the heat is exchanged between two fluids across the tube wall when steam is used for heating, it is necessary to provide a heat exchanger with a structure in which there is absolutely no leakage of either fluid, and consider environmental factors during the use thereof, such as its corrosion resistance, radiation resistance, etc. This means that a great deal of technical effort and a huge cost are required for the selection of material of this device, decisions on its construction, welding techniques and the inspection of welded portions, checks on its air-tightness and lack of leakage, and so forth.

Even if an electric heater such as, for example, a sheathed heater is used instead of steam for heating, it is necessary to provide several devices for temperature control of the heater, resulting in maintenance difficulties. Thus, the prior art system has been designed on the premise that the detailed maintenance or repair of the evaporation concentrator is practically impossible since the concentrator must be disposed in a cell or a glove box of limited space because of the radioactivity of the nitrate solution being treated. As a result, heavy restrictions have been inevitably imposed on the construction of the system, its control method, etc. Anyway, such a two-stage treatment system consisting of separate evaporation concentration equipment and denitrating equipment has been employed when nitrate solution must be treated, not on a laboratory scale, but in large quantities. Since each of these equipments must be operated as a separate equipment unit, not only is the working efficiency poor, but also the whole system must be enlarged, thereby reducing the operational energy efficiency.

SUMMARY OF THE INVENTION

An object of the present invention is to provide an apparatus for continuously concentrating and denitrating a nitrate solution, such as a solution of plutonium nitrate, uranyl nitrate, a mixture thereof or the like, by using microwave, which is capable of the continuous and safe treatment of the evaporation concentration and denitration of the nitrate solution, and is also capable of conducting highly efficient bulk processing.

Further object of the present invention is to provide a continuous concentrating and denitrating apparatus using microwave heating which is easy to manufacture and maintain and, as a whole, is able to provide an energy-saving as well as simple and compact design.

Briefly, an apparatus for continuously concentrating and denitrating a nitrate solution by using microwave according to the present invention has a basic construction in which a concentrating and denitrating vessel rotatably supported is disposed within an oven into which microwave is applied through waveguide means. Such an oven is generally positioned inside a glove box because the nitrate solution being treated, such as a plutonium nitrate solution, a uranyl nitrate solution or a mixture thereof, contains nuclear fuel materials. The concentrating and denitrating vessel comprises a circular vessel body supported rotatably about its center and a plurality of partition plates positioned radially inside the vessel body so as to divide the interior of the vessel body into a plurality of compartments. Each of these compartments functions as an independent cell, so that the criticality safety of the nuclear fuel materials can be held by dividing the nuclear fuel materials into small quantities in the respective compartments of the vessel. Thus, the nitrate solution supplied into the vessel is heated, evaporated, concentrated and denitrated in sequence in each of the compartments during one rotation of the vessel to form a denitrated powder. The nitrate solution is supplied from the outside of the oven into one of the compartments in the vessel through a supply pipe. The denitrated powder produced from the nitrate solution in one of the compartments is received in a pan which is positioned adjacent to a portion of the outer periphery of the vessel. The apparatus further includes means for transferring the denitrated powder from one of said compartment into the receiving pan, and a gas discharge pipe for discharging gas produced during the treatment from the oven.

In one embodiment of the present invention, an evaporation concentrator vessel is also disposed within the oven together with the concentrating and denitrating vessel. The evaporation concentrator vessel has the construction substantially the same as that of the concentrating and denitrating vessel described above. A nitrate solution being treated is first supplied into the evaporation concentrator vessel where it is heated, evaporated and concentrated to form a highly concentrated nitrate solution. The thus obtained concentrated nitrate solution is then transferred to the concentrating and denitrating vessel where it is further concentrated and denitrated to form a denitrated powder.

In another embodiment of the present invention, the evaporation concentrator vessel additionally disposed within the oven comprises a stationary cylindrical vessel body and a tubular waveguide inserted into the cylindrical vessel body. A nitrate solution is first supplied into the cylindrical vessel body of the evaporation concentrator vessel to concentrate to a high degree, and the thus concentrated nitrate solution is then transferred to the concentrating and denitrating vessel where a denitrated powder is produced.

Additional objects and features of the present invention will become apparent from the detailed description of preferred embodiments of the invention, which will be made with reference to the accompanying drawings in which like reference numerals denote like elements.

BRIEF DESCRIPTION OF THE DRAWINGS

FIG. 1 is a schematic sectional view of an embodiment of the present invention;

FIG. 2 is a schematic plan view of a concentrating and denitrating vessel used in the embodiment of FIG. 1;

FIG. 3 is a schematic sectional view of another embodiment of the present invention in which an additional evaporation concentrator vessel is incorporated; and FIG. 4 is a schematic sectional view of still another embodiment of the present invention in which a modified additional evaporation concentrator vessel is incorporated.

PREFFERED EMBODIMENTS OF THE INVENTION

FIGS. 1 and 2 illustrate a basic embodiment of the continuous concentrating and denitrating apparatus using microwave according to this invention. Although not shown, the apparatus of this invention is disposed in a shield box such as a glove box or a cell, and is constructed so that microwave generated by a microwave power unit positioned outside the shield box is applied to the apparatus through waveguides 10. A concentrating and denitrating vessel is disposed in an oven 1 into which microwave is applied. The concentrating and denitrating vessel comprises a circular vessel body 3 rotatably supported by a central rotating shaft 2, with four partition plates 5 positioned radially in the circular vessel body 3 so as to divide nitrate solution being treated 4 (such as plutonium nitrate solution, uranyl nitrate solution, or a mixed solution thereof) fed into the vessel. Thus, as best shown in FIG. 2, the interior of the circular vessel body 3 is divided into four compartments by the partition plates 5, and each of the compartments functions as an independent receptacle. A denitrated powder receiving pan 6 is positioned adjacent to the outer periphery of the vessel body 3, and a means for transferring a denitrated powder 7 produced in one of the compartments of the concentrating and denitrating vessel into the receiving pan 6 is also provided. The transfer means may be embodied, for example, by constructing each of the compartments so that the compartment just adjacent to the receiving pan 6 can be tilted outward to remove the denitrated powder in the compartment into the receiving pan 6, or by making an arrangement in which the denitrated powder in the compartment is transferred into the receiving pan 6 by suction. The apparatus is also provided with a pipe 8 for supplying the nitrate solution being treated into one of the compartments in the concentrating and denitrating vessel, and a gas discharge pipe 9 through which gases produced during the treatment are exhausted from the oven 1. Although not shown, the exhaust gases discharged through the discharge pipe 9 are led into a condenser and then a scrubber. The oven 1 in which the concentrating and denitrating vessel is contained and into which microwave is applied, is preferably designed to have a configuration such that the microwave applied thereinto hits against the inner walls of the oven and is reflected repeatedly, so that it can be utilized effectively in the heating or denitration of the nitrate solution being treated. Typically, a curved surface configuration such as a spherical or spheroidal configuration is preferable.

In the embodiment as shown in FIGS. 1 and 2, four waveguides 10 direct to four compartments in the concentrating and denitrating vessel, respectively. However, it is not essential to provide as many wave guides as the compartments. It is also not required to divide the interior of the vessel body 3 into four compartments, but a suitable number of compartments may be provided, in view of the control of the criticality for safety of the nuclear fuel materials as described hereinbelow.

The operation of the apparatus as shown in FIGS. 1 and 2 will now be described.

The nitrate solution being treated is supplied through the supply pipe 8 into one of the compartments (the one positioned below the pipe 8) in the concentrating and denitrating vessel. In this embodiment, since the criticality safety of the nuclear fuel materials is held by controlling the flat-plate configuration, the depth of the supplied nitrate solution being treated should be less than a predetermined depth (33 mm for a plutonium nitrate solution). The supplied nitrate solution 4 is evaporated and concentrated by the microwave applied through the waveguides 10. The concentrating and denitrating vessel, which is rotatably supported by the shaft 2 as described before, is driven by a drive mechanism 11 including a motor so as to rotate continuously at a predetermined speed (for example, at a speed of about 1-2 cm/min. at the center of the radial direction of the circular vessel), or move intermittently through a predetermined angular distance at predetermined intervals (for example, through about 45° at 30 minute intervals), clockwise in FIG. 2. The solution being treated is thus supplied to each of the compartments in the concentrating and denitrating vessel in sequence, and the solution in each compartment is subjected to concentration (by evaporation) and denitration treatments independently of the other compartments. Each compartment which has been subjected to these treatments reaches a position just adjacent to the denitrated powder receiving pan 6, and at this position, the solution in the compartment is further exposed to microwave to complete the denitration process, and the thus resulting denitrated powder 7 is transferred into the receiving pan 6 by the transfer means. The compartment from which the denitrated powder has been removed is again supplied with a new batch of nitrate solution being treated from the supply pipe 8 for the next sequence of treatments. These operations are conducted repeatedly. Thus, according to the apparatus of this invention, each batch of nitrate solution being treated is heated, evaporated, concentrated, and denitrated continuously, and is then discharged from the system while the concentrating and denitrating vessel rotates fully once.

FIG. 3 illustrates another embodiment of this invention which adopts a two-stage arrangement in which an evaporation concentrator vessel 16 is provided as a first stage before a concentrating and denitrating vessel 15. Both these vessels 15 and 16 are basically the same in structure as that described hereinabove with respect to FIGS. 1 and 2, and hence the description thereof is omitted by representing the like elements by like reference numerals. The concentrating and denitrating vessel 15 and the evaporation concentrator vessel 16 are disposed within a single oven 1, and are connected to each other by a concentrated solution transfer pipe 17. The apparatus of this embodiments shown in FIG. 3 is suitable for use when the initial concentration of the nitrate solution being treated is low, or bulk processing of the solution on a larger scale is required, that is, when it is impossible to use a single-stage denitration system such as that of FIG. 1 to obtain the desired denitrated powder during one rotation of the single concentrating and denitrating vessel, for reasons relating to the control of the criticality for safety. In this embodiment, the nitrate solution being treated is first supplied into the evaporation concentrator vessel 16 where the solution is exposed to microwave and is concentrated to a fairly high degree while the vessel rotates once. The concentrated solution is then supplied through the transfer pipe 17 to the concentrating and denitrating vessel 15 where the solution is further concentrated.

FIG. 4 illustrates still another embodiment of this invention which also adopts a two-stage arrangement and is particularly suitable when the criticality for safety cannot be held by the control of the flat-plate configuration for reasons of limited installation space. In this embodiment, an evaporation concentrator vessel 20 provided as a first stage comprises a stationary cylindrical vessel body 22, so that the criticality safety can be held by controlling the cylindrical configuration. A tubular waveguide 21 is inserted into the cylindrical vessel body 22. The waveguide 21 is provided with openings 23, not only at its end, but also on its sides so as to effectively disperse microwave into the nitrate solution 4 in the vessel body 22. It is desirable that the solution does not enter the waveguide 21, so that the openings 23 are preferably covered with seals made of a microwave-transmissive material such as a tetrafluoroethylene polymer. Also in this embodiment, the nitrate solution being treated is first supplied into the evaporation concentrator vessel 20 through the supply pipe 8, and the concentrated solution is then transferred through a transfer pipe 17 into the concentrating and denitrating vessel 15 for further concentration and denitration treatment.

As explained in the foregoing, the present invention can provide a continuous concentrating and denitrating apparatus using microwave which is capable of the continuous, safe treatment of the evaporation concentration and denitration of the nitrate solution containing nuclear fuel materials. This apparatus also has an extremely high operating efficiency, is capable of providing of bulk processing, and is easy to manufacture and maintain. Thus the invention enables a simple and compact design of the apparatus as a whole, and can also dramatically improve the operational energy efficiency.

Although the present invention has been described with reference to the preferred embodiments thereof, many modifications and alterations may be made within the scope of the appended claims.

What is claimed is:

1. An apparatus for continuous treatment of a nitrate solution of nuclear fuel material by heating, evaporating, concentrating and denitrating said nitrate solution to produce a denitrated powder, said apparatus comprising:
   an oven into which microwave energy is applied through waveguide means;
   an evaporation concentrator vessel disposed within said oven, said evaporation concentrator vessel including a stationary cylindrical vessel body and a tubular waveguide inserted into said cylindrical vessel body, said tubular waveguide having openings at the end and on the sides thereof, said cylindrical vessel body having a size for limiting the amount of material to be treated to less than that necessary for maintaining criticality for safety of material to be treated;
   a concentrating and denitrating vessel disposed within said oven, said concentrating and denitrating vessel including a circular vessel body supported rotatably about its center and a plurality of partition plates positioned radially inside said vessel body so as to divide the interior of said vessel body into a plurality of compartments, each of said compartments having a size for limiting the amount of material to be treated to less than that necessary for maintaining criticality for safety of material to be treated;
   a first pipe for supplying a nitrate solution of nuclear fuel material from the outside of the oven into said evaporation concentrator vessel;
   a second pipe for supplying a concentrated solution produced in said evaporation concentrator vessel into one of said compartments in said concentrating and denitrating vessel;
   a pan for receiving a denitrated powder produced from said concentrated nitrate solution in one of said compartments in said concentration and denitrating vessel, said pan being positioned adjacent to a portion of the outer periphery of said concentrating and denitrating vessel;
   means for transferring said denitrated powder from one of said compartments in said concentrating and denitrating vessel into said pan; and a gas discharging pipe for discharging gas produced during the treatment from said oven; said continuous treatment by heating, evaporating and concentrating the supplied nitrate solution being accomplished continuously in said evaporation concentrator vessel to form the concentrated nitrate solution and said continuous treatment by further heating, evaporating, concentrating and denitrating the concentrated nitrate solution being accomplished continuously and in sequence in each of said compartments in said concentrating and denitrating vessel during one rotation thereof to form the denitrated powder.

2. The apparatus according to claim 1, wherein each of said openings of said tubular waveguide is covered with a seal made of a microwave-transmissive material.

3. The apparatus according to claim 1, wherein said waveguide means comprises a plurality of waveguide tubes, each of said waveguide tubes directing microwave to each of said compartments in said concentrating and denitrating vessel.

4. The apparatus according to claim 1, wherein said circular vessel body in said concentrating and denitrating vessel is rotatably supported at its center by a rotating shaft.

5. The apparatus according to claim 1, further including means for continuously rotating said circular vessel body in said concentrating and denitrating vessel at a predetermined speed.

6. The apparatus according to claim 1, further including means for intermittently moving said circular vessel body in said concentrating and denitrating vessel through a predetermined angular distance at predetermined intervals.

* * * * *